United States Patent [19]

Takagishi et al.

[11] 4,246,153

[45] Jan. 20, 1981

[54] PROCESS FOR PRODUCING AQUEOUS SOLUTION OF POLYUREAPOLYAMIDE THERMOSETTING RESIN

[75] Inventors: Hisao Takagishi, Toyonaka; Haruo Tanaka, Hirakata, both of Japan

[73] Assignee: Sumitomo Chemical Company, Limited, Osaka, Japan

[21] Appl. No.: 54,441

[22] Filed: Jul. 3, 1979

[30] Foreign Application Priority Data

Aug. 25, 1978 [JP] Japan ................................ 53-104128

[51] Int. Cl.³ .............................................. C08L 61/24
[52] U.S. Cl. ................................ 260/29.4 R; 260/6; 260/15; 260/29.4 UA; 428/530
[58] Field of Search ............. 260/29.4 R, 6, 15; 528/259, 260; 428/530, 476

[56] References Cited

U.S. PATENT DOCUMENTS 3,842,039  10/1974  Vargiu et al. .................... 260/69 R

*Primary Examiner*—Theodore E. Pertilla
*Attorney, Agent, or Firm*—Stevens, Davis, Miller & Mosher

[57] ABSTRACT

An aqueous solution of a thermosetting resin which improves water resistance and ink receptivity of coated paper and gives coated paper emitting little or almost no formaldehyde odor is produced by a process comprising the steps, (1) a reaction of urea with a polyalkylenepolyamine,
(2) dehydration-condensation of the resulting reaction product with a dibasic carboxylic acid,
(3) a reaction of the resulting reaction product with urea to produce a polyureapolyamide, and
(4) a reaction of the polyureapolyamide with formaldehyde in an aqueous medium under acidic condition, or under alkaline condition and then under acidic condition.

9 Claims, No Drawings

PROCESS FOR PRODUCING AQUEOUS SOLUTION OF POLYUREAPOLYAMIDE THERMOSETTING RESIN

The present invention relates to an aqueous solution of a novel thermosetting resin, its production, a paper-coating composition containing it and a method for improving water resistance and ink receptivity of coated paper. More particularly, it relates to an aqueous solution of a novel thermosetting resin which not only improves water resistance and ink receptivity of coated paper, but also emits little or no formaldehyde odor when applied to coated paper.

Various paper-coating compositions comprising pigments, adhesives and other assisting agents have so far been developed, and as resins added to the compositions to give water resistance to paper, aminoplast resins such as melamine-formaldehyde resins, urea-formaldehyde resins and the like are well known, for example, in Japanese Pat Appln Kokoku (Post-Exam Publn) No. 11667/1969. These resins are superior in water resistance, but on the other hand they have drawbacks such as generation of a large quantity of formaldehyde from coated paper and poor ink receptivity on printing.

As a result of extensive study, the present inventors found a thermosetting resin superior not only in improving water resistance and ink receptivity on printing of coated paper, but also in generating little or almost no formaldehyde from coated paper.

The present invention provides a novel aqueous solution of a thermosetting resin produced by a process comprising the steps, (1) reaction of urea with a polyalkylenepolyamine,
(2) dehydration-condensation of the resulting reaction product with a dibasic carboxylic acid,
(3) reaction of the resulting reaction product with urea to produce a polyureapolyamide, and
(4) reaction of the polyureapolyamide with formaldehyde in an aqueous medium under an acidic condition, or under an alkaline condition and then under an acidic condition, a paper-coating composition containing said thermosetting resin and a method for producing coated paper by using said composition.

The process of the present invention includes the following four steps:

1. First step reaction: deammoniation between urea and a polyalkylenepolyamine
2. Second step reaction: dehydration-condensation between the first step reaction product and a dibasic carboxylic acid
3. Third step reaction: deammoniation between the second step reaction product and urea
4. Fourth step reaction: reaction between the third step reaction product and formaldehyde.

The polyalkylenepolyamine used in the present invention means one having two primary amino groups and at least one secondary amino group, and is represented by the formula, $$H_2N—R_1—NH_2$$

wherein $R_1$ is a divalent aliphatic chain having at least four carbon atoms and having at least one secondary amino group in the main chain. Examples of the polyalkylenepolyamines are diethylenetriamine, triethylenetetramine, tetraethylenepentamine, iminobispropylamine, 3-azahexane-1,6-diamine, 4,7-diazadecane-1,10-diamine and the like. These polyalkylenepolyamines may be used alone or in combination.

The dibasic carboxylic acid used in the present invention is represented by the formula, $$HOOC—R_2—COOH$$

wherein $R_2$ is a divalent $C_2$ to $C_8$ aliphatic or aromatic hydrocarbon. Examples of the dibasic carboxylic acids are aliphatic carboxylic acids, e.g. succinic acid, glutaric acid, adipic acid, sebacic acid, maleic acid, fumaric acid, etc., aromatic carboxylic acids, e.g. isophthalic acid, terephthalic acid, etc., and mixtures thereof.

In the first step reaction of the present invention, the deammoniation between urea and the polyalkylenepolyamine gives a polyamine of the formula [I] having a urea linkage in the molecule, as shown in the following reaction formula (1):

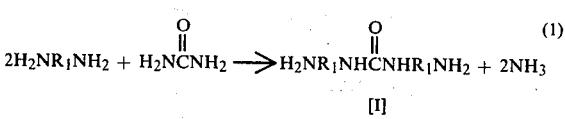

wherein $R_1$ is as defined above. The molar ratio of urea to the polyalkylenepolyamine is preferably in the vicinity of 1:2. The reaction temperature is 100° to 200° C., preferably 120° to 170° C. The reaction is carried out while removing generated ammonia from the reaction system. The reaction generally comes to an end in 2 to 8 hours.

In the second step reaction, the dehydration-condensation between the polyamine [I] and the dibasic carboxylic acid, gives a polyureapolyamidopolyamine of the formula [II], as shown in the following reaction formula (2):

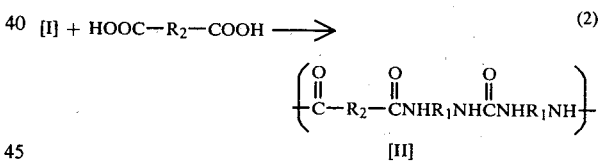

wherein $R_2$ is as defined above. The amount of dibasic carboxylic acid is preferably within a range of 0.8 to 1.2 moles per mole of the polyalkylenepolyamine. The reaction temperature is 120° to 250° C., preferably 130° to 200° C. The reaction is carried out for 2 to 10 hours while removing produced water from the reaction system.

In the third step reaction, the polyureapolyamidepolyamine [II] and urea are subjected to deammoniation. In this reaction, urea links to the secondary amino group in the polyureapolyamidepolyamine [II], i.e. the secondary amino group contained in the chain represented by $R_1$, by deammoniation. When the $R_1$ is represented by the formula, $$+(CH_2)_m NH\overline{)_n}(CH_2)_l—$$

wherein n is an integer of 1 or more, and l and m are each an integer of 2 or more, the deammoniation between the polyureapolyamidepolyamine [II] and urea gives a polyureapolyamide of the formula [III], as shown in the following reaction formula (3):

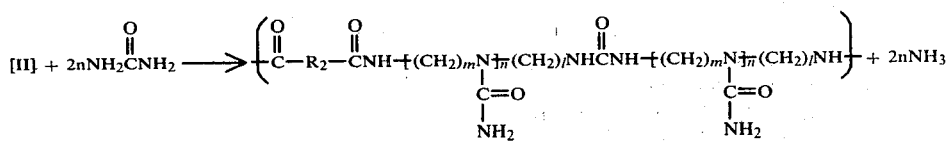

wherein l, m, n, and $R_2$ are as defined above. The amount of urea is within a range of 0.5 to 1.5 moles, preferably 0.7 to 1.2 moles per equivalent of the secondary amino group in the polyalkylenepolyamine used in the first step reaction. The reaction can be carried out at a temperature of 100° to 180° C., preferably 120° to 150° C. for 1 to 5 hours while removing generated ammonia from the reaction system.

In the fourth step reaction of the present invention, the polyureapolyamide [III] thus obtained is dissolved in water and then allowed to react with formaldehyde. The reaction is carried out as follows: The polyureapolyamide [III] and formaldehyde are dissolved in water to make an aqueous solution having a concentration of 20 to 70% by weight, preferably 30 to 60% by weight; the resulting solution is adjusted to a pH of 7 or less, preferably 3.5 to 6.5 with an acid, e.g. hydrochloric acid, sulfuric acid, phosphoric acid, formic acid, or acetic acid; and then the solution is kept at a temperature of 40° to 80° C. for 1 to 10 hours. As described above, this reaction is carried out under an acidic condition, but the objective compound of the present invention can also be obtained by continuing this reaction firstly under an alkaline condition, for example at a pH of 8 to 12, and then under an acidic condition, for example at a pH of 7 or less, preferably 3.5 to 6.5. In the latter case, the reaction under an alkaline condition can be carried out at a temperature of 40° to 80° C. for 0.5 to 3 hours and then under an acidic condition at a temperature of 40° to 80° C. for 1 to 10 hours. The amount of formaldehyde is 0.2 to 1.0 mole, preferably 0.3 to 0.7 mole, per mole of the total urea used for the synthesis of the polyureapolyamide [III]. The term "formaldehyde" also includes formalin and formaldehyde-generating compounds such as paraformaldehyde and trioxane. After the reaction is finished, the reaction mixture is, if necessary, adjusted to pH of 6 to 9 with sodium hydroxide or potassium hydroxide to obtain the final aqueous solution product of the present invention.

As described above, the foregoing four reactions are essential to the present invention. If the first step reaction is, for example, omitted, that is, direct dehydration-condensation between the polyalkylenepolyamine and the dibasic carboxylic acid, and then the third and fourth step reactions of the present invention are carried out, the whole reaction solution takes a gel form so that the object of the present invention can not be achieved. On the other hand, when the fourth step reaction is carried out under an alkaline condition alone, the resulting aqueous solution of thermosetting resin is not desirable as a paper-coating composition, because the quantity of formaldehyde generated from coated paper is large although there is no large difference in water resistance and besides ink receptivity becomes poor.

The thermosetting resin which is produced by the process of the present invention and which is separated from the reaction medium, i.e. in a solid form, is not so good in stability (subject to gelation), and large in hygroscopicity, and therefore the resin is put on the market in an aqueous solution having a solid content of 30% by weight, 50% by weight or the like. The solid content can be controlled after completion of the reaction for example, by using a pre-determined solid content-specific gravity relationship. The thus obtained aqueous solution product is good in stability and can be used without any trouble.

The aqueous solution of thermosetting resin produced by the process of the present invention can be used advantageously as paper-coating compositions. The paper-coating compositions of the present invention are produced by various methods known to those skilled in the art. That is, they can be produced by blending pigments (e.g. clay, calcium carbonate, satin white), latices (e.g. SB latex, acrylic ester latex), anionic dispersing agents (e.g. sodium polyacrylate, ammonium polyacrylate, polyphosphoric acid), flow-improving agents (e.g. starch, casein) and the aqueous solution of the thermosetting resins produced as described above.

The paper-coating compositions of the present invention may contain one or more conventional aminoplast resins having the effect of producing water resistance. These compositions can be applied to paper by methods known to those skilled in the art, and are useful for obtaining coated paper being superior in water resistance and ink receptivity, and generating little formaldehyde.

The present invention will be illustrated with reference to the following examples, which by no means limit the scope of the present invention and in which all percents are by weight unless otherwise specified.

EXAMPLE 1

To a four-necked flask equipped with a thermometer, reflux condenser and stirrer were added 292 g (2 moles) of triethylenetetramine and 60 g (1 mole) of urea, and the mixture was heated at 145° to 150° C. for 4 hours while removing generated ammonia from the reaction system. Thereafter, 146 g (1 mole) of adipic acid was added thereto, followed by condensation at 150° to 155° C. for 5 hours. After cooling the reaction mixture to 120° C., 240 g (4 moles) of urea was added thereto, followed by deammoniation at 125° to 130° C. for 2 hours. Thereafter, 1350 g of water was gradually added to the reaction system to obtain an aqueous solution of polyureapolyamide.

Thereafter, 202.5 g (2.5 moles) of 37% formalin was added to the aqueous solution, which was then adjusted to a pH of 5 with conc. hydrochloric acid and kept at 65° C. for 4 hours with stirring. The solution was then cooled to 30° C. and adjusted to a pH of 8 with a 30% aqueous sodium hydroxide solution to obtain an aqueous solution of thermosetting resin having a solid content of 30%.

EXAMPLE 2

To the same equipment as used in Example 1 were added 206 g (2 moles) of diethylenetriamine and 60 g (1 mole) of urea, followed by deammoniation at 140° to 145° C. for 5 hours. Thereafter, 146 g (1 mole) of adipic acid was added thereto, followed by dehydration-condensation at 160° to 170° C. for 2 hours. After cooling the reaction mixture to 120° C., 120 g (2 moles) of urea was added thereto, followed by deammoniation at 130° to 140° C. for 1.5 hours. Thereafter, 900 g of water was gradually added to the reaction system to obtain an aqueous solution of polyureapolyamide.

Thereafter, 145.8 g (1.8 moles) of 37% formalin was added to the aqueous solution, which was then adjusted to a pH of 4.5 with 20 N sulfuric acid and kept at 60° C. for 3 hours with stirring. The solution was then cooled to 30° C. and adjusted to a pH of 7.5 with a 30% aqueous sodium hydroxide solution to obtain an aqueous solution of thermosetting resin having a solid content of 30%.

EXAMPLE 3

To the same equipment as used in Example 1 were added 292 g (2 moles) of triethylenetetramine and 60 g (1 mole) of urea, followed by deammoniation at 150° to 153° C. for 3 hours. Thereafter, 146 g (1 mole) of adipic acid was added thereto, followed by dehydration-condensation at 155° to 160° C. for 5 hours. After cooling the reaction mixture to 130° C., 240 g (4 moles) of urea was added thereto, followed by deammoniation at 130° to 135° C. for 2 hours. Thereafter, 550 g of water was gradually added to the reaction system to obtain an aqueous solution of polyureapolyamide.

Thereafter, 121.5 g (1.5 moles) of 37% formalin was added to the aqueous solution, which was then adjusted to a pH of 4 with 20 N sulfuric acid and kept at 70° C. for 4 hours with stirring. The solution was then cooled to 30° C. and adjusted to a pH of 6.5 with a 30% aqueous sodium hydroxide solution to obtain an aqueous solution of thermosetting resin having a solid content of 50%.

EXAMPLE 4

To the same equipment as used in Example 1 were added 206 g (2 moles) of diethylenetriamine and 60 g (1 mole) of urea, followed by deammoniation at 145° to 150° C. for 3 hours. Thereafter, 118 g (1 mole) of succinic acid was added thereto, followed by dehydration-condensation at 150° C. for 4 hours. After cooling the reaction mixture to 130° C. 96 g (1.6 moles) of urea was added thereto, followed by deammoniation at 125° to 130° C. for 3 hours. Thereafter, 540 g of water was gradually added to the reaction system to obtain an aqueous solution of polyureapolyamide.

Thereafter, 105.3 g (1.3 moles) of 37% formalin was added to the aqueous solution, which was then adjusted to a pH of 10 with 10 N aqueous sodium hydroxide solution and kept at 60° C. for 2 hours with stirring. The solution was then re-adjusted to a pH of 5.5 with conc. hydrochloric acid and kept at 60° C. for 3 hours with stirring. The solution was then cooled to 25° C. and adjusted to a pH of 7.5 with a 30% aqueous sodium hydroxide solution to obtain an aqueous solution of thermosetting resin having a solid content of 40%.

EXAMPLE 5

Paper-coating compositions were prepared by blending each water-resisting agent of the aqueous solutions of thermosetting resins obtained in Examples 1 to 4 or Sumirez Resin 613 (a trade name for melamine-formaldehyde resin produced by Sumitomo Chemical Co.), with other components in proportions shown in Table 1 (parts by weight being on a solid basis); and water was added to each blend so as to obtain each aqueous solution having a solid content of 50%.

TABLE 1

|  |  | (Parts by weight) |
| --- | --- | --- |
| Formulation | Clay | 85 |
|  | Calcium carbonate | 15 |
|  | Dispersing agent (sodium polyacrylate type) | 0.5 |
|  | Styrene-butadiene latex | 14 |
|  | Starch | 6 |
|  | Water-resisting agent | 0.5 |

The paper-coating composition thus obtained was coated on one side of base paper (basis weight, 80 g/m$^2$) at a rate of about 20 g/m$^2$ by means of a wire rod bar having piano wire wound thereon. Immediately after coating, the coated paper was dried at 100° C. for 1 minute in a hot-air drier, and then it was subjected to calendering two times at 50° C. and under a line pressure of 80 kg/cm to obtain single-faced coated paper. The coated paper obtained was conditioned at 20° C. for 12 hours at a humidity of 65%, and tested for water resistance, quantity of generated formaldehyde and ink receptivity.

In determining the quantity of formaldehyde, the coated paper immediately after hot-air drying was enclosed in a polyethylene bag to prevent the mixing of formaldehyde from other sources.

The results are shown in Table 2.
Testing methods were as follows:
Water resistance:
(1) Wet rubbing method About 0.1 ml of demineralized water was dropped on the coated surface of the paper which was then rubbed seven times with the tip of a finger. The soluble matter released from the rubbed surface was transferred to black paper, and the amount of the matter was evaluated by the naked eye (rating: 1∼5), and water resistance was judged on the basis of the following standard:

| Rating | 1 ∼ 5 |
| --- | --- |
| Water resistance | poor ∼ excellent |

(2) Wet picking method

The coated surface of the paper was wetted by a water-supplying roll and printed by RI tester (produced by Akira Seisakujo). The state of picking was evaluated by the naked eye (rating: 1∼5), and water resistance was judged on the basis of the following standard:

| Rating | 1 ∼ 5 |
| --- | --- |
| Water resistance | poor ∼ excellent |

Determination of formaldehyde:

Determination was carried out on 2.5 g of the coated paper according to JIS L 1041-1976, Acetylacetone method (A method) in the liquid-phase extraction method (2).

Ink receptivity:

The coated surface of the paper was wetted by a water-supplying roll and printed by RI tester (produced by Akira Seisakujo). Ink receptivity was observed by the naked eye (rating: 1~5) and judged on the following standard:

| Rating | 1 ~ 5 |
|---|---|
| Ink receptivity | poor ~ excellent |

Reference Example 1

To the same equipment as used in Example 1 were added 60 g of water, 150 g (1.03 moles) of triethylenetetramine and 146 g (1 mole) of adipic acid, and the mixture was dehydrated by raising its temperature to 210° C. with stirring. After stirring at this temperature for 30 minutes, the mixture was cooled to 120° C. and 240 g (4 moles) of urea was added thereto, followed by deammoniation at 130° C. for 2 hours. Thereafter, 960 g of water was added to the reaction system to obtain an aqueous homogeneous solution, and 162 g (2 moles) of 37% formalin was added thereto. The solution was adjusted to a pH of 5 with conc. hydrochloric acid and heated to 65° C. Immediately on beginning stirring at this temperature, the viscosity of the solution rose rapidly and formed a gel in 20 minutes.

REFERENCE EXAMPLE 2

To the same equipment as used in Example 1 were added 292 g (2 moles) of triethylenetetramine and 60 g (1 mole) of urea, followed by deammoniation at 145° C. for 4 hours. Thereafter, 146 g (1 mole) of adipic acid was added thereto, followed by dehydration-condensation at 150° C. for 5 hours. After cooling the reaction mixture to 120° C., 240 g (4 moles) of urea was added thereto, followed by deammoniation at 125° to 130° C. for 2 hours. Thereafter, 1350 g of water was gradually added to the reaction system to obtain an aqueous solution of polyureapolyamide. And 202.5 g (2.5 moles) of 37% formalin was added to the solution, which was then adjusted to a pH of 10 with a 30% aqueous sodium hydroxide solution and kept at 65° C. for 4 hours with stirring. The solution was cooled to 30° C. and adjusted to a pH of 8 with conc. hydrochloric acid to obtain an aqueous solution of thermosetting resin having a solid content of 30%.

REFERENCE EXAMPLE 3

To the same equipment as used in Example 1 were added 60 g of water, 150 g (1.03 moles) of triethylenetetramine and 146 g (1 mole) of adipic acid, and the mixture was dehydrated by raising its temperature to 210° C. with stirring. After stirring at this temperature for 30 minutes, the mixture was cooled to 120° C. and 240 g (4 moles) of urea was added thereto, followed by deammoniation at 130° C. for 2 hours. Thereafter, 990 g of water was added to the reaction system to obtain an aqueous homogeneous solution, and 324 g (4 moles) of 37% formalin was added thereto. The solution was adjusted to a pH of 10 with a 30% aqueous sodium hydroxide solution, heated to 65° C. and stirred at this temperature for 2 hours. Thereafter, the solution was cooled to 30° C. and adjusted to a pH of 8 with conc. hydrochloric acid to obtain an aqueous solution of thermosetting resin having a solid content of 30%.

According to the method described in Example 5, paper-coating compositions were prepared using the aqueous solutions obtained in Reference Examples 2 and 3, single-faced coated paper was obtained using the compositions and the coated paper was tested for water resistance, quantity of generated formaldehyde and ink receptivity.

The results are shown in Table 2.

TABLE 2

| Item | | Water-resisting agent | Examples | | | | Reference Examples | | | |
|---|---|---|---|---|---|---|---|---|---|---|
| | | | Resin from Example 1 | Resin from Example 2 | Resin from Example 3 | Resin from Example 4 | No addition of water-resisting agent | Sumirez Resin 613 | Resin from Reference Example 2 | Resin from Reference Example 3 |
| Physical properties of coating liquor | Viscosity (cps) | pH | 7.5 | 7.4 | 7.3 | 7.4 | 7.4 | 7.6 | 7.5 | 7.5 |
| | | Immediately after treatment | 265 | 257 | 275 | 268 | 236 | 241 | 257 | 488 |
| | | After 24 hours | 295 | 288 | 303 | 297 | 281 | 235 | 303 | 435 |
| Amount of coating liquor (g/m$^2$) | | | 20.7 | 20.2 | 21.2 | 20.8 | 20.1 | 20.5 | 21.4 | 20.8 |
| Performances of coated paper | Quantity of generated formaldehyde (ppm) | | 11 | 13 | 7 | 10 | 1 | 78 | 45 | 63 |
| | Water resistance (Wet rubbling method) | | 4 | 4 | 4 | 4 | 1 | 4 | 3.5 | 4 |
| | Water resistance (Wet picking method) | | 4 | 4 | 4 | 4 | 1 | 4 | 4 | 3.5 |
| | Ink receptivity | | 4.5 | 4 | 4.5 | 4 | 1 | 3 | 2.5 | 3 |

What is claimed is:

1. A process for producing an aqueous solution of a thermosetting resin comprising the steps of,
   (1) reacting urea with a polyalkylenepolyamine at a temperature of 100° to 200° C., while the ammonia generated is taken out of the reaction system, the polyalkylenepolyamine being used in an amount of about 2 moles per mole of urea,
   (2) dehydrating-condensing the resulting reaction product with a dibasic carboxylic acid of the formula, HOOC—$R_2$—COOH, wherein $R_2$ is a divalent $C_2$ to $C_8$ aliphatic or aromatic hydrocarbon, at a temperature of 120° to 250° C., while the water produced is taken out of the reaction system, the dibasic carboxylic acid being used in an amount of about 0.8 to 1.2 moles per mole of the polyalkylenepolyamine,
   (3) reacting the resulting reaction product with urea to produce a polyureapolyamide at a temperature of 100° to 180° C., while the ammonia produced is taken out of the reaction system, the urea being used in an amount of 0.5 to 1.5 moles per equivalent of the secondary amino group present in the polyalkylenepolyamine, and (4) reacting the polyureapolyamide with formaldehyde in an aqueous medium under acidic condition, or under alkaline condition and then under acidic condition, the formaldehyde being used in an amount of 0.2 to 1.0 mole per mole of total urea used in the steps (1) and (3).

2. A process according to claim 1, wherein the polyalkylenepolyamine is at least one member selected from the group consisting of diethylenetriamine, triethylenetetramine, tetraethylenepentamine, iminobispropylamine, 3-azahexane-1,6-diamine and 4,7-diazadecane-1,10-diamine.

3. A process according to claim 1, wherein the dibasic carboxylic acid is at least one member selected from the group consisting of succinic acid, glutaric acid, adipic acid, sebacic acid, maleic acid, fumaric acid, isophthalic acid and terephthalic acid.

4. A process according to claim 1, wherein the step (4) is carried out using an aqueous solution of the polyureapolyamide produced in the step (3) in a concentration of 20 to 70% by weight.

5. A process according to claim 1, wherein the step (4) is carried out at a pH of 3.5 to 6.5.

6. A process according to claim 1, wherein the step (4) is carried out at a pH of 8 to 12 and then at a pH of 3.5 to 6.5.

7. An aqueous solution of a thermosetting resin produced by a process comprising the steps of, (1) reacting urea with a polyalkylenepolyamine at a temperature of 100° to 200° C., while the ammonia generated is taken out of the reaction system, the polyalkylenepolyamine being used in an amount of about 2 moles per mole of urea, (2) dehydrating-condensing the resulting reaction product with a dibasic carboxylic acid of the formula, HOOC—$R_2$—COOH, wherein $R_2$ is a divalent $C_2$ to $C_8$ aliphatic or aromatic hydrocarbon, at a temperature of 120° to 250° C., while the water produced is taken out of the reaction system, the dibasic carboxylic acid being used in an amount of about 0.8 to 1.2 moles per mole of the polyalkylenepolyamine, (3) reacting the resulting reaction product with urea to produce a polyureapolyamide at a temperature of 100° to 180° C., while the ammonia produced is taken out of the reaction system, the urea being used in an amount of 0.5 to 1.5 moles per equivalent of the secondary amino group present in the polyalkylenepolyamine, and (4) reacting the polyureapolyamide with formaldehyde in an aqueous medium under acidic condition, or under alkaline condition and then under acidic condition, the formaldehyde being used in an amount of 0.2 to 1.0 mole per mole of total urea used in the steps (1) and (3).

8. A composition useful for production of coated papers comprising a pigment, a latex, a surfactant, a flow-improver and a thermosetting resin produced by a process of claim 1.

9. A process for producing a coated paper, comprising applying the composition of claim 8 to paper.

* * * * *